FIG. I

INVENTORS
WILLIAM B. ZELINA
JAMES L. BUCHANAN

BY Charles L. Lovacheck
ATTORNEY

FIG. 2

INVENTORS
WILLIAM B. ZELINA
JAMES L. BUCHANAN
BY Charles L. Lovercheck
attorney

INVENTORS
WILLIAM B. ZELINA
BY JAMES L. BUCHANAN

United States Patent Office 3,355,656
Patented Nov. 28, 1967

3,355,656
CONTROLLED RECTIFIER SYSTEMS UTILIZING ENERGY LOGIC TO EFFECT COMMUTATION
William B. Zelina and James L. Buchanan, Erie, Pa., assignors to General Systems, Inc., a corporation of Pennsylvania
Continuation of application Ser. No. 302,133, Aug. 14, 1963. This application Dec. 1, 1966, Ser. No. 598,382
33 Claims. (Cl. 322—28)

ABSTRACT OF THE DISCLOSURE

In a controlled rectifier system of the type wherein a controlled rectifier having a control element is connected in series circuit relationship with a source of voltage and a load and is rendered conductive by electrical signals applied to the control element and rendered non-conductive by energy of a capacitor, an energy reference circuit means is provided which includes a breakover device, such as a Zener or Shockley type semiconductor diode, connected so as to sense the energy level of the capacitor and allow the capacitor to be connectable to force current through the controlled rectifier in the reverse direction only when the energy level of the capacitor exceeds a predetermined level, which predetermined level assures that sufficient energy is available to render the controlled rectifier non-conductive.

This is a continuation of application, Ser. No. 302,133, filed Aug. 14, 1963, now abandoned.

This invention relates to regulators and, more particularly, to an improved circuit for regulating a voltage for example the output voltage of a generator. The regulator disclosed has other applications that will be apparent to those skilled in the art, for example, in regulating the speed of a machine.

The general problem of controlling the field of D.C. generator to effect a particular desired output characteristic is as old as the D.C. generator itself. Many mechanical, electromechanical, and electronic devices have been provided to solve this general problem. In all cases, the problem is one of controlling the field of the generator, either manually or automatically in response to some stimuli, the stimuli being a function of the desired output characteristic of the machine being controlled. For example, if the output voltage of the D.C. machine is being controlled, the stimuli in this case is a function of the machine voltage and a voltage regulator is effected. Likewise, a device is effected to control the machine current, torque, horsepower, or even temperature.

The present invention concerns the solid state electronic field control art. The early attempts in this art involved the use of transistors used in voltage regulators and many attempts have been made along this line. Later efforts were made using silicon controlled rectifiers. The present invention provides an improved voltage regulator circuit utilizing silicon controlled rectifiers. In the present invention, the D.C. generator acts to self-excite its field through a silicon controlled rectifier which, when turned on, will continue to conduct until current through the device is interrupted or reversed for a prescribed time.

D.C. control using switching amplifiers

The first so-called switching amplifiers were introduced approximately 12 years ago and in the interim many approaches have been utilized to effect this function.

It may be in order to describe the basic theory of a switching amplifier. The overall function, as the word amplifier infers, is to effect a sizable change in load power in response to a very small change in control power.

The basic idea of a switching amplifier offered an extremely efficient approach to controlling power, i.e., the dissipation in a switch is negligible since the voltage drop across the switch when it is conducting is very small and hence, the "on" dissipation is negligible; and further, the current flowing through the switch in its off condition is negligible and hence, the "off" dissipation of the switch is also negligible.

Instantaneous load voltage

Figures 4, 5A, 5B, 6:
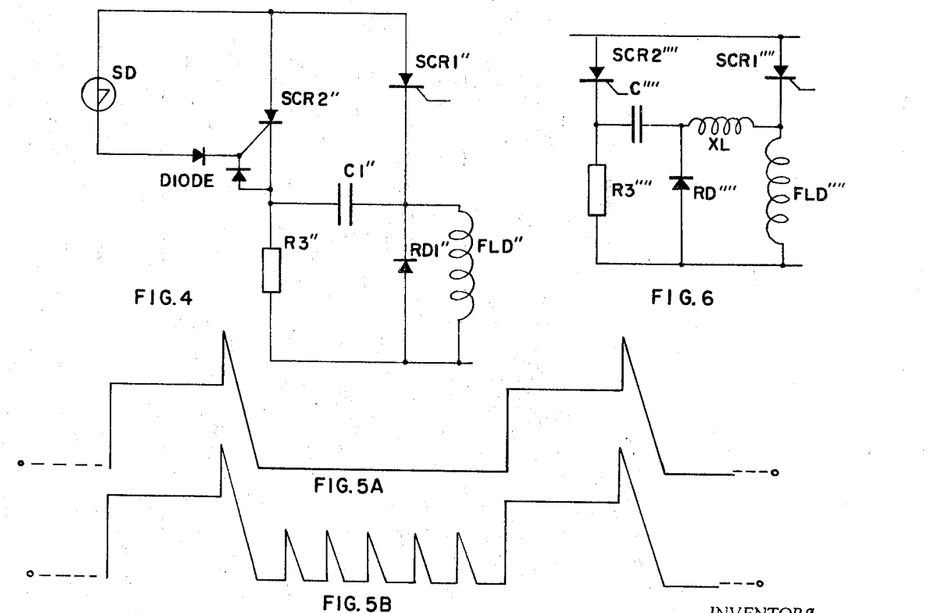
FIGS. 5A and 5B show certain electrical wave shapes encountered.
FIGS. 6, 7, 8, and 9 are schematic circuits illustrating certain elements involved in the present invention.

FIGURE 6 shows the instantaneous typical voltage wave form across a load when a switching amplifier is used. It is readily seen that the average load voltage can be expressed mathematically by Equation 1:

(1) $$V \text{ average} = V_{dc} \frac{T_{on}}{T_{on} + T_{off}}$$

$T_{on}$ is the time duration that the switch is closed or conducting and $T_{off}$ is the time that the switch is open or nonconducting.

Pulse width modulation

Generally, switching amplifiers will fall into one of two categories dictated by the method used in the control of the amplifier to effect a change in the average load voltage in response to a control signal. It can be seen from Equation 1 that if the sum of $T_{on}+T_{off}$ is held constant by the control and $T_{on}$ is varied in response to a change in control signal, the average voltage will be controlled from 0 when $T_{on}=0$ to 100% of the input voltage when $T_{on}$ is equal to the period or the previously mentioned sum of $T_{on}+T_{off}$. The generally accepted name for this type of switching amplifier control in the state of the art is "Pulse Width Modulation," i.e., the voltage pulse width varies while the period or repetition rate of the pulse is held constant. This family of switching amplifiers were the first to be introduced and used the transistor as the solid state switching element.

Pulse frequency modulation

A second type of switching amplifier was introduced about 7 years ago shortly after the introduction of the silicon controlled rectifier. This switching amplifier utilized control which set $T_{on}$ at a constant and varied $T_{off}$ to effect a change in the average load voltage. Again, referring to Equation 1, when $T_{off}=0$ the average load voltage will be equal to 100% of the D.C. input voltage. Further, when $T_{off}$ equals infinity, the load voltage will diminish to zero. Since the period is the sum of $T_{on}+T_{off}$, in effect, the control functions by changing the period. The frequency or repetition rate is simply the reciprocal of the period. Therefore, it follows that this type of control functions by changing the repetition rate or frequency of the voltage pulse applied to the load. The art of switching amplifiers commonly refers to this type of control as "Pulse Frequency Modulation" to distinguish its operation from the previously described "Pulse Width Modulation."

Switching amplifiers using the silicon controlled rectifier as the switching element There is a very logical reason why the pulse frequency modulation type of control evolved when the silicon controlled rectifier (SCR) was used as the switching element.

The SCR is a peculiar solid state device in that it is turned on by a pulse applied to its control element and remains in the on state until current through the device is interrupted. Since current through the SCR must be interrupted to turn the device off, it logically follows that some sort of energy storage must take place during the time that the SCR is conducting. This stored energy in turn, then, must be returned to the load in such a manner that current through the SCR will be interrupted. It is the energy storage requirement that generally dictates a fixed finite on time for the voltage pulse that is applied to the load. This follows logically since energy cannot be transferred from a source to a storage element instantaneously.

Turn off characteristic of the SCR

Manufacturers of the SCR characterize their devices according to their ability to be turned off. Typically, this characteristic might read as follows: "At maximum operating junction temperature of the SCR, the current through the device must be interrupted and further, the voltage across the device must be reversed for 20 microseconds to return the device to its nonconducting state after it has been conducting 15 amperes." It is this single SCR characteristic which is generating the many disconcerting problems in the application of the SCR to switching amplifiers in the control of D.C. voltage.

Figure 7:
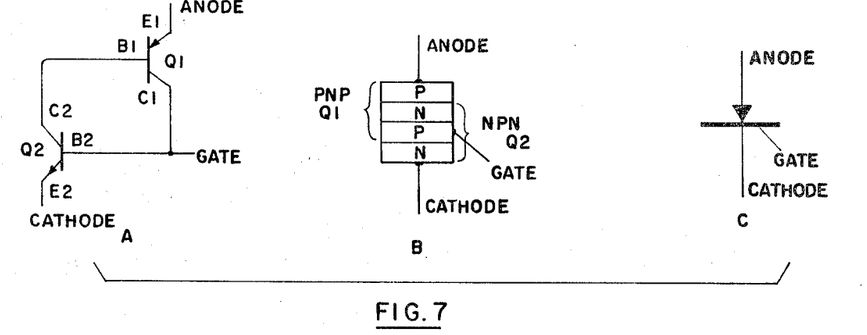

The SCR characteristic can be duplicated by connecting two complementary transistors as shown in FIG. 7-A. It can be shown that when a signal is applied to the base of Q2, this signal will be amplified and the collector current of Q2 will flow from the base of Q1 where it is further amplified by Q1; and the collector current of Q1 is fed to the base of Q2. After the initial pulse signal on the base of Q2, both Q1 and Q2 will immediately saturate and no further signal is required. As previously described, this is the exact characteristic of the SCR. For ease of fabrication, the SCR utilizes a common semi-conductor layer for the base of Q1 and collector of Q2; and further, a common layer for the collector of Q1 and base of Q2. FIG. 7-B shows the layers of semiconductors and it is seen that Q1 is made up of the PNP layers whereas Q2 is made up of the NPN layers. The interconnection of Q1 and Q2 becomes automatic in the fabrication of the device. It should be apparent that the regeneration between Q1 and Q2 of the circuit shown in FIG. 7-A is what saturates both transistors. If the current through these devices is interrupted, this regeneration will also be interrupted and the device will turn off. However, the 20 microsecond time requirement and the reversing voltage requirement are not readily understood. These turn off characteristic requirements come about as follows: The charges that are "in transit" physically between the four layers of FIG. 7-B must be given time to either be removed or recombined to return the SCR to its off or nonconducting state. The reversing voltage requirement assists in removing or sweeping out some of these charges back through the anode of the SCR. Further, then, the 20 microsecond time requirement allows for the remaining trapped charges to recombine, i.e., holes and electrons combine to neutralize this "in transit" charge.

Consequence of a failure to turn off

Generally speaking, if an attempt to turn off the conducting SCR at the end of an on pulse is not successful, the switching amplifier fails in a full output state. The load voltage will immediately go to the full input D.C. voltage. There have been many circuit approaches that attempt to make the occurrence of these failures rare. Systems have been evolved where one or two successive failures could occur before the switching amplifier finally lost all control and applied full D.C. voltage to the load. These circuit approaches have been varied in complexity and in general, none have offered a suitable universal solution that would guarantee against failures under any and all conditions of load transients and source voltage transients.

The switching amplifier was made practical by the introduction of solid state switching elements because of their alleged ability to operate at a very high repetition or switching rate as compared with electromechanical switching devices. The typical SCR switching voltage regulator may have an on time pulse fixed by the circuitry to be approximately 5 milliseconds. This means that the maximum switching frequency of the switching amplifier could reach 200 cycles per second. If we totalize the number of switching operations required for 10 years of successful operation, the number becomes astronomical. Statistically then, the possibility of a switching amplifier failure due to a failure to turn off presents itself a large number of times during the operation of the system. It is this extensive exposure that has, in general, caused the many switching amplifier failures experienced by those attempting to use the SCR as a switching element. System transients which statistically occur very rarely and often had not been understood or considered cause switching amplifier failures. The need, then, for a circuit approach that would eliminate all possibilities of a failure to turn off the SCR has long been sought by those using the SCR as a switching element in the switching amplifier. The work described herein teaches the use of energy logic techniques to preclude failures to turn off the SCR.

Energy logic turn off (commutation)

Figure 8:
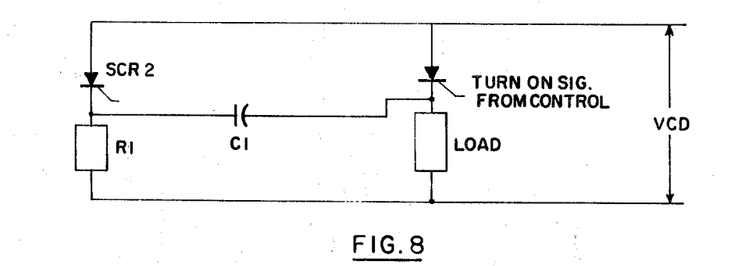

The energy logic concept guarantees that the energy stored will be more than sufficient to satisfy the manufacturer's turn off characteristic as previously described for the SCR that is used as the main switching element. FIGURE 8 shows a typical commutation arrangement with no particular means shown to signal the turning on of the SCR's. We know that the energy stored in the capacitor C1 of FIG. 8 can be expressed mathematically as follows:

$$(2) \qquad E_{c1} = \tfrac{1}{2} C1 V_1^2$$

This equation suggests that any circuit approach that will fix the voltage of the energy storage capacitor C1 of FIG. 8 previous to the initiation of the turn off or commutation sequence will in effect provide a failure-free switching amplifier. Several examples of such circuit approaches are disclosed herein. Other approaches will be obvious to those skilled in the art. Any logic circuit that can determine the voltage level and hence energy level of C1 and then signal the turn on of SCR2 only when this level reaches a preset value and that will guarantee to more than adequately satisfy the turn off characteristics of SCR1 will offer a solution to this problem. To determine wether a circuit will in fact operate in the energy logic mode, one simply determines mathematically the equation for the voltage on C1 at that instant when SCR2 is turned on to initiate the commutation of SCR1. If this expression contains any terms except constants and the components characteristics, for example, ohms, break over voltage, etc., the circuit will not operate in the energy logic mode. This expression for all circuit arrangements shown herein will contain only constants and component characteristics.

On the other hand, for the many circuit approaches that have been proposed, invariably this expression will contain the D.C. source voltage. For these circuit, should the D.C. source voltage transiently change, the energy stored on C1 will also change and consequently when it is less than the energy required to satisfy the turn off characteristics of SCR1, failure to turn off or commutate will occur and hence a failure of the switching amplifier will occur. In general, any voltage break over device can be used in the energy logic approach to measure the voltage on C1 and signal the commencement of commutation.

Figure 9:
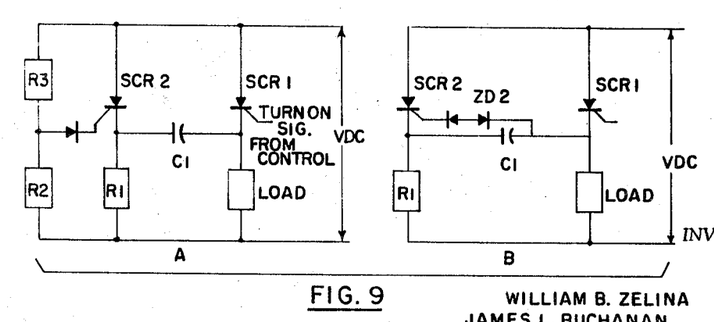

Comparison of an energy logic commutation approach to a conventional commutation approach We can probably best show the fundamental differences between the conventional commutation system and those energy logic systems described herein by referring to FIG. 9. FIGURE 9-A shows a typical arrangement that has often been used. This arrangement in fact is used in R. C. Bridgeman et al. Patent No. 3,209,234 and R.C. Bridgeman Patent No. 3,209,236. Resistors R2 and R3 in those patents form a voltage divider to set a gate potential for SCR2 which will fire this device when the voltage across R1 becomes lower than this reference potential. It is readily understood that when SCR1 is turned on, capacitor C1 charges through resistor R1. As the capacitor C1 becomes charged, the voltage across R1 drops and mathematically is the source voltage minus the capacitor voltage. The initiation of commutation or turn off of SCR1 occurs when the voltage across R1 as previously described drops below the voltage set by the voltage divider action of R2 and R3. Mathematically, then, the expression for voltage on C1 at the instant that SCR2 is fired and the commutation of SCR1 is started can be expressed as follows:

(3) $$V_{c1} = V_{dc} \frac{R3}{R2+R3}$$

Combining Equation 3 and Equation 2, we can write the expression for the energy on capacitor C1 at the instant that commutation commences as follows:

(4) $$E_{c1} = \tfrac{1}{2} C1 V_{dc}^2 \left(\frac{R3}{R2+R3}\right)^2$$

Since we can assume the value of C1 and the values of resistors R2 and R3 will remain constant, Equation 5 can be written as follows:

(5) $$E_{c1} = K V_{dc}^2$$

Equation 5 shows that the energy stored in the commutation capacitor C1 at the instant of commutation of SCR1 will vary as the square function of the input voltage $V_{dc}$. Hence, any momentary or transient change in $V_{dc}$ in the downward direction will allow commutation to proceed with a vastly insufficient level of energy stored in capacitor C1 to successfully satisfy the turn off characteristic requirement of SCR1.

FIGURE 9-B shows one form of energy logic commutation. Referring to this figure, it is seen that capacitor C1 will charge through resistor R1 when SCR1 is turned on. SCR2 will be turned on when the capacitor charge has exceeded the break over voltage of $Z_{d2}$. For this arrangement we can write the expression for the capacitor voltage at the instant of initiation of commutation of SCR1 as follows:

(6) $$V_{c1}^1 = V_{zd2}$$

Combining Equation 6 and Equation 2, the energy stored in the capacitor C1 can be expressed as follows:

(7) $$E_{c1}^1 = \tfrac{1}{2} C1 V_{zd2}$$

Since the break over voltage of $V_{zd2}$ and the value of capacitor C1 are device circuit constants and can be assumed to have remained unaffected throughout the operation of the system, Equation 7 can be rewritten simply as follows:

(8) $$E_{c1}^1 = K^1$$

Equation 8 shows that the energy stored in capacitor C1 for the arrangement of FIG. 9-B will be constant regardless of any external system load or voltage transients.

The circuit of FIG. 9-B then is truly operating in the energy logic mode of commutation. A number of circuit arrangements are disclosed herein which yield the same end result. There should be many other arrangements possible and obvious to those skilled in the art.

In each of the examples disclosed, the silicon controlled rectifier is turned off by a capacitor which has been charged through a resistor to a preset voltage and connected to the proper terminals to interrupt current flow. The connection is made by a second silicon controlled rectifier.

A safety device is provided to limit the voltage at the collector of the transistor comprising the amplifying circuit and at the silicon controlled rectifier gate.

A deburst circuit is provided which prevents the silicon controlled rectifier from being refired a number of times or cycles in succession due to the adverse effects of the cumulative series field, armature reaction, and eddy currents on the generator armature voltage and its response.

More particularly, it is an object of the invention to provide an improved voltage regulating circuit.

Another object of the invention is to provide a voltage regulator circuit wherein two silicon controlled rectifiers are provided, one of which carries the field current for the generator and the other silicon controlled rectifier controls the voltage across the first silicon controlled rectifier to stop the flow of current therethrough in a highly reliable manner.

Still another object of the invention is to provide an improved voltage regulator incorporating a deburst circuit.

A further object of the invention is to provide an improved solid state voltage regulator.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Now with more particular reference to the drawings, the generator GEN is shown having a positive terminal wire 11 and a negative terminal wire 12 which are connected to the battery B. The generator has a field FLD which is supplied current through the silicon controlled rectifier SCR1. The components making up the circuit are:

| | |
|---|---|
| SCR1 | Silicon controlled rectifier. |
| SCR2 | Do. |
| ZD1 | Zener diode. |
| ZD2 | Do. |
| ZD3 | Do. |
| TT1 | Transistor. |
| RD1 | Diode. |
| RD2 | Do. |
| RD3 | Do. |
| RD4 | Do. |
| RD5 | Do. |
| RD6 | Do. |
| RD7 | Do. |
| RD8 | Do. |
| R1 | Resistor. |
| R2 | Do. |
| R3 | Do. |
| R4 | Do. |
| R5 | Do. |
| R6 | Do. |
| R7 | Do. |
| R8 | Do. |
| R9 | Do. |
| R10 | Do. |
| R11 | Do. |
| R12 | Do. |
| R13 | Do. |
| C1 | Capacitor. |
| C2 | Do. |
| C3 | Do. |
| C4 | Do. |

| C5 | Capacitor. |
| --- | --- |
| C6 | Do. |
| C7 | Do. |
| O | Any reverse current device. |

Figure 1:
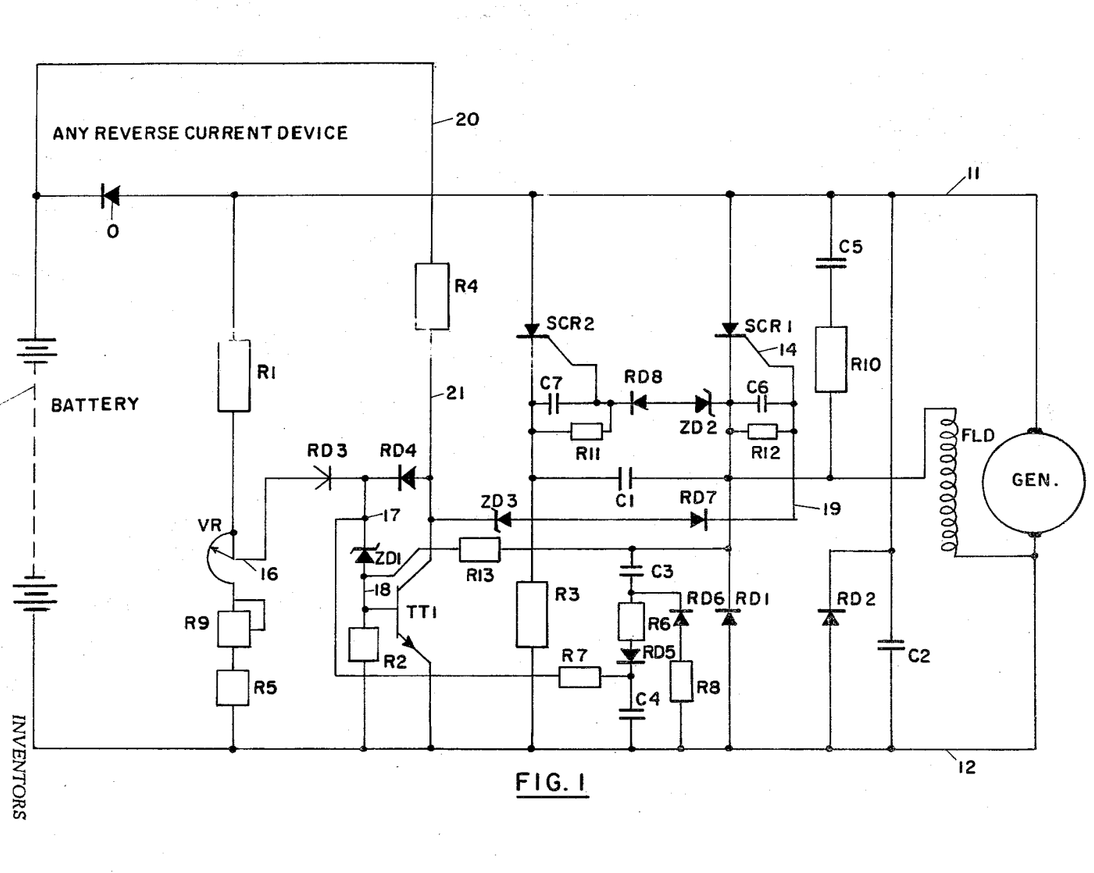
FIG. 1 shows a schematic wiring diagram of a voltage regulator circuit according to the invention.

The D.C. generator shown in FIG. 1 acts to self-excite its field through the silicon controlled rectifier SCR1. SCR1 functions somewhat like a thyratron tube in that once turned on, it will continue to conduct until the current through it is interrupted. The current to turn off SCR1 is furnished by capacitor C1 which is charged from the D.C. generator BUS terminal voltage through wire 11 through SCR1 and resistor R3. When the voltage across C1 reaches a level sufficient to overcome the barrier of Zener diode ZD2, a current is forced into the gate 15 of SCR2 and turns it on, thus turning SCR1 off. The operation of SCR1 and SCR2 will be more completely described hereinafter.

The D.C. BUS voltage between wires 11 and 12 is measured by the voltage divider made up of R1, VR, R9, and R5. When the BUS voltage between wires 11 and 12 reaches a point where the divider voltage on the adjustable terminal 16 of VR exceeds the Zener barrier voltage of ZD1, a current flows from the wire 16 to wire 17, ZD1, and wire 18 into the base of transistor TT1 to saturate or turn it on. This action cuts off the gate voltage to SCR1 following the succeeding turn off cycle. The field of the D.C. machine being highly inductive will force a current to flow through RD1 when SCR1 is turned off and field voltage reaches zero. Then RD1 freewheeling action maintains a smooth generator field current and air gap flux, by way of wire 19, when SCR1 is non-conductive.

When TT1 is turned on it has a saturation voltage of one volt. Furthermore, the forward voltage drop of RD1, when it is conducting, adds directly to this voltage. Since these voltages would tend to fire SCR1, ZD3 is added to provide a barrier voltage for current from these voltages.

R13 allows current to flow into TT1 base to keep it saturated any time SCR1 is turned on, thereby reducing the dissipation of TT1 and making possible the use of a smaller transistor.

Build-up circuit

An example of an application of this system is in the charging of storage batteries. A generator exhibits a self build-up characteristic, which is insufficient to supply the necessary energy to render the silicon controlled rectifier conductive since this voltage generally is larger than the residual voltage of the generator. The solution to this problem used by R. C. Bridgeman et al. in Patent No. 3,209,234 and Patent No. 3,209,236 uses a normally closed relay contact to shunt SCR1 until a sufficient voltage level is reached to commence the firing of SCR1. At this point, the relay picks up and the normally closed contacts open and normal operation commences. A slight variation of this arrangement is also used in the General Electric Patent to W. B. Zelina and J. L. Buchanan. The arrangement shown in FIG. 1 consisting of wire 20, resistor R4, and transistor TT1 offers a static approach to this build-up problem. The otherwise potentially high level of reliability suggested by a solid state voltage regulator in the said patents is jeopardized by the presence of an electro-mechanical device, i.e., a relay.

In FIG. 1 hereof, the battery is utilized to provide a current sufficient to fire SCR1. It can be seen referring to FIG. 1 that this battery current will flow through R4, through ZD3, through RD7, through the wire 19, and into the gate 14 of SCR1 and then out of the cathode of SCR1 and through the field of the generator to wire 12 which is the negative of the battery B. It should be pointed out that ZD3 was used to cancel out the saturation voltage of TT1. With transistors having low saturation voltages, the Zener diode ZD3 is not necessary. In effect then, the firing energy needed to turn SCR1 on is furnished from the battery B. Further, this current flows through the field of the generator to enhance buildup. As the predetermined regulated voltage is reached, TT1 is driven to saturation by the signal through the Zener reference diode ZD1 and normal regulating is effected.

Safety device

The reference Zener ZD1 also acts to limit the voltage at the collector of transistor TT1 by way of wire 18 to a safe value for transistor TT1 and the gate of controlled rectifier SCR1. As this voltage on wires 21 tries to rise, diode RD4 conducts through Zener diode ZD1 to the base of transistor TT1 and out of its emitter, thus turning TT1 partially on to limit this voltage to a safe value. Resistor R2 provides temperature stability by providing a path for transistor TT1 collector-base leakage currents which prevail at high temperatures. At high temperatures, silicon Zener diodes (ZD2 and ZD3) will leak. R11 and R12 provide a path for any such leakage currents to dissipate.

Transient voltage suppression

Capacitors C6 and C7 limit harmful voltage spikes between the gate to the cathode of SCR1 and SCR2. Resistor R10 and capacitor C5 limit voltage transients on the anode to the cathode of SCR1. These transients are caused by wire inductance and the rapid rate of change of current common in this type of circuit.

System transient protection

The capacitor C2 is a large electrolytic type and it absorbs the voltage transients between wires 11 and 12 caused by various load switching. Diode RD2 prevents reverse voltage that would damage certain of the components of the circuit. This reverse voltage occurs when the reverse current relay O opens to interrupt reverse current that is flowing out of the battery into the generator. The cause of this voltage is $$L\frac{di}{dt}$$

where L is the natural inductance of the generator and $di/dt$ is the natural rate of change of the current that is caused by the opening of the reverse current relay. At this time, diode RD2 freewheels this current.

Deburst circuit

Burst is a tendency for SCR1 to be refired for a number of cycles in succession due to "dips" in and response of armature voltage when SCR1 is fired. These "dips" are caused by the coupling between the series and shunt field windings and the poor response is caused by the armature reaction and eddy currents of the D.C. generator.

In some applications, the deburst circuit contributes to a smoother voltage output, that is, in the circuit in the example shown in FIG. 1, less ripple on the output voltage of the generator being regulated. The SCR voltage regulators function by applying a voltage pulse of essentially fixed duration to the field of the generator and sensing output voltage. The succeeding voltage pulse will be applied when the output voltage is below a predetermined level. This operation assumes that the generator output voltage will follow the field pulse voltage, i.e., that the generator output voltage at the end of a field voltage pulse will be higher than the generator output voltage at the beginning of the field voltage pulse. FIG. 5A shows the voltage pulses typically applied to the field of the generator being regulated by the system. However, in actual operation, it is found that the generator armature voltage at the instant that the voltage pulse is terminated is actually lower than it was at the beginning of the field voltage pulse. This phenomenon varies from machine to machine and generally can be considered a function of the machine design and the type of iron used in the armature and field circuit of the machine.

The sensing circuit, sensing that the armature voltage is still lower than the regulated value will refire SCR1 and apply a second voltage pulse. This sequence will continue until the armature voltage finally rises above the predetermined value being regulated. This will result in a series of voltage pulses applied to the field of the generator followed by an extended "off" period. The resulting armature voltage will experience a rather large ripple content.

In some cases, where the load of the generator is incandescent lights, a low frequency flicker will be observed in the lights. Generally, this is considered objectionable and undesirable. It has been found that if a delay is forced between successive field pulses, the armature voltage will rise rapidly during this delay and normal application of field voltage pulses as shown in FIG. 5A will result. This fixed delay can be easily attained by coupling a capacitor charged by the field voltage pulse directly to the controlling transistor TT1 through some suitable resistor so that the capacitor-resistor time constant will set this fixed delay. This, in fact, results in a simple and suitable solution to the problem in many cases. However, since a fixed delay is forced between successive field voltage pulses, it should be apparent that the resulting system will not be capable of applying 100% of the armature voltage to the field. This would then constitute a serious limitation to the resulting regulating system in many applications. This essential delay is provided and also full or 100% voltage output is allowed with the deburst circuitry described herein. Referring to FIG. 1, the deburst circuitry consists of capacitors C3 and C4, resistors R6, R7, and R8, and diodes RD5 and RD6. The function of the deburst circuit is as follows: When SCR1 is turned on and the aforementioned field voltage pulse is applied to the field, it is also applied to the series circuit comprising C3, R6, RD5, and C4. The voltage charge that will result on capacitor C4 will be set by the voltage change on C3. However, it is apparent that C3 discharges during the "off" cycle and the discharge amount is set by resistor R8. Therefore, if the off time is long, C3 will discharge fully and a maximum charge will be applied to C4 during the subsequent voltage pulse applied to the field of the generator.

The charge on C4 acts through R7 on transistor TT1 to force a delay in the refiring of SCR1, i.e., so long as TT1 is maintained saturated SCR1 will not refire. The time of this delay is set by the voltage magnitude or charge magnitude on C4 and the time constant set by R7 and C4. Now as the system approaches a full field condition, it is apparent that the discharge time for C3 is decreased. This, in turn, diminishes the charge that will be allowed to flow into C4 and hence, the time that TT1 is maintained in saturation will also diminish.

The deburst circuitry can be considered as functioning by C3 metering the charge into C4 with this charge being a function of the previous off time of SCR1. It should be apparent that as full field condition is reached, C3 will have no time to discharge and hence will be maintained at full armature voltage and C4 will be at zero charge. Actually, C4 will be maintained at the voltage of Zener diode ZD1. However, from an operational point of view, this voltage level is insufficient to cause any signal to flow to transistor TT1.

This network provides a voltage on capacitor C4 at the end of an on cycle which will act to keep transistor TT1 turned on for a time to delay refiring of SCR1 and allow for the generator armature voltage to recover. The advantage of this network is that as the system calls for full field, the residual voltage of C4 available for delay fades to zero, thus allowing the system to deliver full field. This burst problem exists on present regulators. The effect of the deburst circuit is to minimize generator ripple.

*Energy logic circuit*

The commutation or turning off of SCR1 must be done with a very high level of reliability since if SCR1 fails to turn off, a system failure occurs. When SCR1 turns on, generator armature voltage is supplied to the field through SCR1 and capacitor C1 begins to charge positive on the SCR1 cathode side with respect to SCR2 cathode.

It has been previously demonstrated that silicon controlled rectifiers will turn off if they are reverse biased (cathode positive with respect to anode) for a prescribed time $t_b$. Since a certain maximum field current must be handled, say, $I_{f)max.}$, and since, due to the inductive nature of the field, this current will not change appreciably in a time of the order $t_b$, it has been previously demonstrated in Equation 6 that if a certain level of voltage is always provided on C1 before commutation begins, sufficient energy will be made available to assure a successful commutation cycle. (Equation 7.) Mathematically, the voltage $V_{c1)critical}$ is:

$$V_{c1} = \frac{1}{C1} \int_0^{t_b} I_{f)max.} (d_t)$$

and since, as aforesaid, due to field inductance, $I_{f)max.}$ is a constant for the duration of the time $t_b$, the equation becomes:

$$V_{c1)critical} = \frac{1}{C1} I_{f)max.} t_b$$

The solution of the general problem then of successful commutation is arrived at by assuring a voltage on C1 substantially greater than the $V_{c1)critical}$ before commutation is embarked upon; i.e., SCR2 is turned on. The simple logic circuit that accomplishes this purpose is the Zener diode ZD2 connected from the cathode of SCR1 to the gate of SCR2. The Zener or breakover voltage of ZD2 is sufficiently greater than the $V_{c1)critical}$ so as to assure a comfortable safety margin over the actual minimum required $t_b$.

Figure 2:
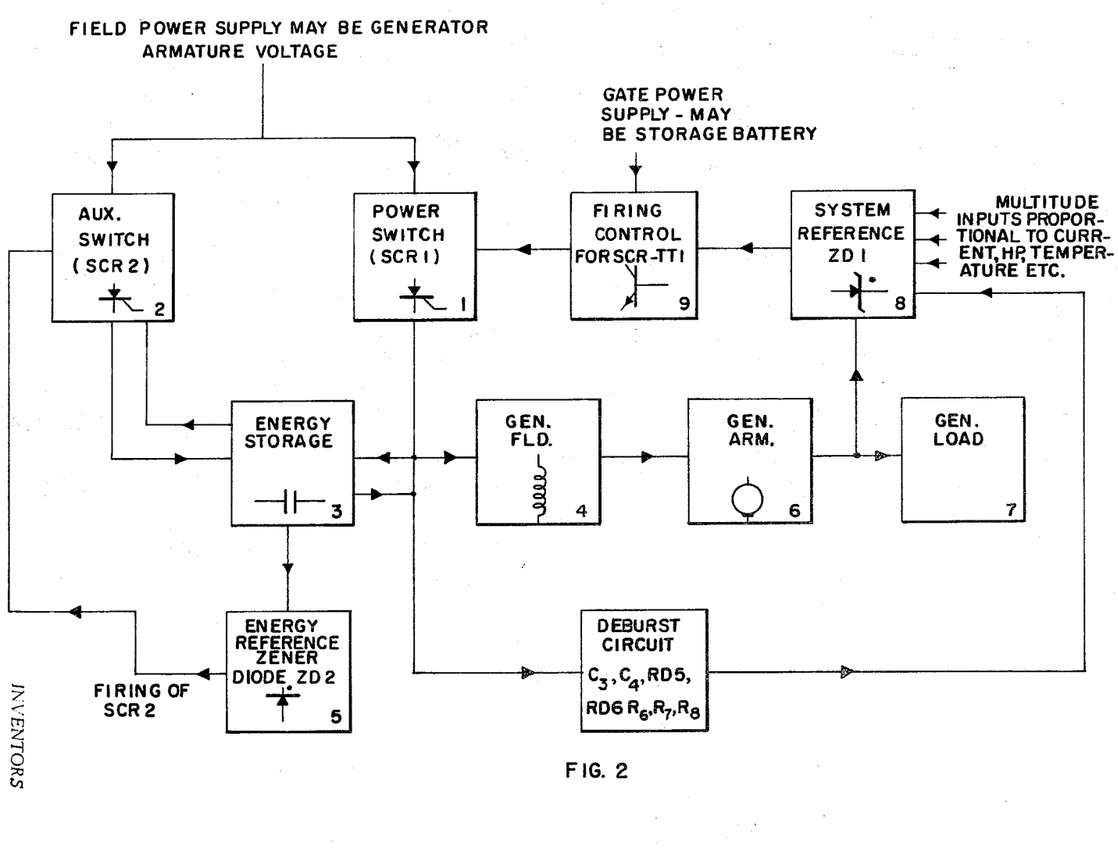
FIG. 2 shows a block diagram of the regulator.

Now with reference to the block diagram shown in FIG. 2, each block indicates the portion of the schematic diagram of FIG. 1 that it contains.

Both the power switch SCR1 and the auxiliary switch SCR2 will turn on to a fully conductive state if a predetermined signal is applied to them as previously set forth herein. Further, the turn off of SCR1 and SCR2 is accomplished by the interruption of current through the switch (SCR) for a specified minimum time along with a minimum reverse voltage to sweep out carriers in transit in the device upon the initiation of the turn off cycle hereinafter referred to as a commutation cycle.

The alternate commutation will occur if sufficient energy exists in the storage block 3. That is to say, when SCR1 is conducting, if SCR2 is turned on when sufficient energy of the proper polarity is stored in C1 of block 3, SCR1 will be turned off and vice versa. One important feature of this invention is the manner in which SCR2 is fired. Previous systems of this character time the firing of SCR2 after the start of conduction of SCR1 and depend upon there being enough energy of the proper polarity on C1 when SCR2 is fired. Since energy is being delivered on a preset time function, these prior systems do not offer the ultimate in commutation reliability due to variables introduced by system transients in both the rate of energy deliver to C1 and the timing of SCR2.

Block 5 shows an energy reference Zener diode ZD2 which measures the voltage and hence energy level ($E_{c1} = \frac{1}{2} C1\, VZD_2^2$) of capacitor C1. When and only when this energy level has reached a preset value compatible with system requirements will SCR2 be turned on. Thus, the logic approach depicted in FIG. 2 has eliminated the possibility of commutation failure, i.e., failure to turn off SCR1.

Three alternate direct methods of physically accomplishing the aforesaid described energy logic are depicted in the four circuits shown in FIGS. 3, 4, 5, and 6.

FIG. 1 shows one circuit wherein Zener diode ZD2 is connected from the cathode of SCR1, or, more specifically, from the side of C1 which will be charged positive when energy is being stored to turn off SCR1. This Zener diode ZD2 will begin to conduct only when sufficient voltage has been established on the capacitor to overcome the Zener voltage of ZD2. As seen in FIG. 1, the current conducted through ZD2 will flow into the gate of SCR2, thus firing that device and starting the commutation cycle of SCR1.

Figure 3:
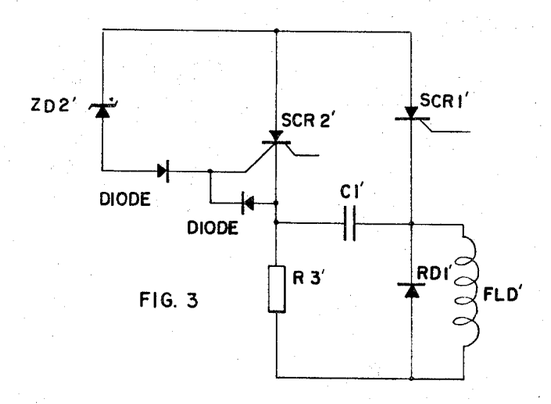
FIGS. 3, 4, and 5 show additional embodiments of the controls for the silicon controlled rectifier controlling the field current.

In another embodiment specifically shown in FIG. 3, the Zener ZD2′ is connected to the anode of SCR2′ to, in effect, measure the voltage applied in the forward direction to SCR2′. This is possible since when SCR1′ is conducting, the voltage impressed in the forward direction on SCR2′ is equal to the capacitor voltage of C1′ plus the forward drop of SCR1′ which is negligible.

In the embodiment of the invention shown in FIG. 4, the Zener ZD2 is replaced by a device known as a Shockley diode indicated as SD. This diode has all the characteristics of a silicon controlled rectifier except that it is a voltage sensitive device in that when the voltage across the device exceeds a certain designed value, it will turn on. After SD has turned on, the operation of the circuit shown in FIG. 4 will be identical to that of FIG. 3 wherein Zener diode ZD2′ is used.

Only a small difference in overall operation of the system will result if the circuit of FIGS. 3 or 4 is used instead of the circuit shown in FIG. 1. The reason for this is the effect of the small wiring inductance of the loop including SCR2′ and capacitor C1′. This inductance will provide a sufficient reverse voltage on SCR2′ to turn it off for a range of field currents. This does not, in any way, show up in the operation of the circuit shown in FIG. 1. In the circuits in FIGS. 3 and 4, however, when SCR2′ and SCR2″ turns off and SCR1′ and SCR1″ is off, the voltage on C1′ and C1″ will discharge through R3′ and R3″, applying voltage to SCR2′ and SCR2″ which, when it reaches a certain value, will fire SCR2′ and SCR2″. This results in the field voltage picture shown in FIG. 5B.

FIGS. 5A and 5B show the instantaneous field voltage. During the off time of SCR1 when the field voltage should be zero (see FIG. 5A) as it is for the circuit of FIG. 1, a series of small voltage pulses appear on the field FLD in the FIGS. 3 and 4 circuits (see FIG. 5B) due to the continuous refiring of SCR2. This would place a definite limit on the minimum field voltage that could be controlled by the system which, in some cases, might not be tolerable.

Figure 5:
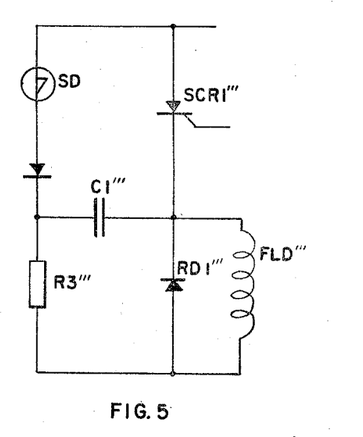
Figure 6:
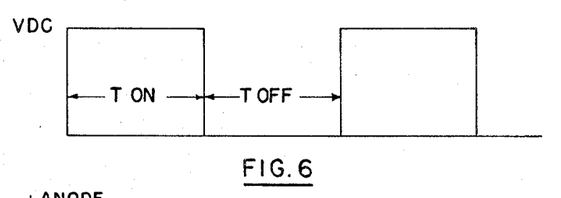

Another embodiment of the invention which has the same minimum field voltage problems as the FIG. 3 and FIG. 4 circuits is shown in FIG. 5. Here, SCR2 and its associated firing circuits are replaced by a power version of the aforementioned Shockley diode. This circuit does have advantages of being more economical and simple than the circuits previously shown and, where the resulting minimum field voltage can be tolerated, it finds utility. There are other methods of accomplishing this logic energy measurement function which will become obvious to those skilled in the art upon viewing of those aforesaid. For example, the Zener diode ZD2 in the circuit of FIG. 1 can be replaced by a Shockley diode and suitable current limiting resistor with no change in performance.

Recently, there has been concern about the possible effects on the silicon control rectifiers due to the current that flows shortly after conduction is initiated. It is believed by some that this current conduction during the early interval after firing occurs essentially in a very small area of the device instead of the entire area as it does after a steady state has been reached. Also, in most circuits as in the circuit shown in FIG. 1, a sweep out current flows at this instant which is much larger than the normal load current. The circuit shown in FIG. 6 provides a simple inexpensive method of limiting this current. This device is a small reactor XL. Since the voltage across reactor XL is $$E_{XL} = L_X \frac{dI}{dt}$$

where LX is the inductance of reactor XL, any rate of change of current can be set by choosing the value of LX. Further, the rate will be held for both SCR1 and SCR2″.

Furthermore, if it is desired to simply limit the current during turn on to the steady state value for SCR1″, XL can be made to saturate which may have certain advantages from a commutation energy loss consideration in some cases. By designing the circuit so that the saturation of reactor XL is rounded rather than sharp, i.e., providing substantial after saturation inductance, the advantage of both the non-saturating and the saturating reactor can be utilized. That is, a limit can be set on the rate of rise of current in SCR1 by the after saturation inductance and a limit on the magnitude of current that will be reached above steady state load current can be set by the saturation phenomena of XL.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

We claim:

1. A regulator for controlling the field of a dynamo-electric machine comprising
   a machine having an armature and a field,
   a first electric valve having a first and a second power terminal,
   said first valve and said field being connected in series,
   the series circuit made up of said field and first valve being connected in parallel with said machine armature,
   a second electric valve having a first and a second power terminal and a control terminal,
   said second valve having said first power terminal connected to said first power terminal of said first valve,
   said second power terminal of said second valve being connected through a capacitor to said second power terminal of said first valve,
   a first resistor connected in series with said first valve and said capacitor,
   said first resistor, said capacitor, and said first valve being connected in parallel with said armature,
   threshold sensing means conductive when said capacitor is charged to a predetermined value to excite the control terminal of said second valve, rendering said second valve conductive when said threshold sensing means becomes conductive whereby the potential of said power terminals of said first valve approach said predetermined potential of said capacitor, rendering said first valve non-conductive.

2. The regulator recited in claim 1 wherein
   said first valve has a control terminal,
   a voltage sensing means for sensing the voltage of said armature,
   and means connecting said voltage sensing means to the control terminal of said first valve whereby the supply of signals to said control element is blocked when the voltage of said armature reaches a predetermined value.

3. The regulator recited in claim 2 wherein
   a deburst circuit is provided and one power terminal of said first valve is connected to said deburst circuit and said deburst circuit is connected in parallel with said generator field.

4. A voltage regulator for a generator having an armature and a field comprising
   a first electric valve having two terminals connected in series with said field and having a control,
   said field and said first valve being connected in parallel with said armature,
   first control means connected to said first valve control for turning said first valve on whereby current can flow through said field, energy storage means; and means including a second electric valve operatively connected to sense the energy level of said energy storage means to allow the energy of said energy storage means to render said first electric valve non-conductive when the energy level of said energy storage means exceeds a predetermined value.

5. The regulator recited in claim 4 including a third electric valve having first and second power terminals and a control terminal, said first power terminal being connected to the first power terminal of said first electric valve, said second power terminal being connected through said energy storage means to the second power terminal of said first electric valve and said control terminal connected to said means for sensing the energy level of said energy storage means to cause said third electric valve to be rendered conductive when the energy level of said energy storage means exceeds the predetermined value.

6. The regulator recited in claim 5 wherein said second electric valve is a breakover device of the Zener-type connected across said energy storage means and to the control terminal of said third electric valve.

7. A voltage regulator for connection to a source of voltage to be regulated comprising:
a first electric valve having a control element and connected to said source and to control means connected to said control element to cause said first electric valve to conduct current to increase said voltage,
a second electric valve connected to said source,
energy storage means connected to said valves and receiving a charge from said voltage source; and energy reference circuit means operatively connected to said energy storage means for rendering said energy storage means operative to turn off said first electric valve when the energy level of said energy storage means exceeds a predetermined value.

8. The regulator recited in claim 7 wherein
said second valve has a control element and
said energy reference circuit means comprises a Zener diode connecting the control element of said second electric valve to said source of voltage.

9. The regulator recited in claim 8 wherein
said means to cause said first valve to conduct current comprises
a transistor actuated by a second Zener diode,
said second Zener diode being connected so that it conducts when said voltage to be regulated reaches a predetermined value.

10. The regulator recited in claim 7 wherein
said energy reference circuit means comprises a Shockley diode connecting said control element of said second electric valve to said source of voltage.

11. The voltage regulator recited in claim 7 wherein
said energy storage means comprises a capacitor,
and a reactor is connected in series with said capacitor and said source of voltage to conduct field current when said first electric valve is off.

12. The regulator recited in claim 11 wherein
said reactor is designed to saturate at a current value less than the value at which said first electric valve will conduct.

13. In an electrical circuit arrangement of the type wherein a first electric valve having a control element is connected in series circuit relationship with a source of voltage and a load and is arranged to be rendered conductive by electrical signals applied to said control element and rendered non-conductive by energy of an energy storage means, the improvement comprising: the combination with said energy storage means of an energy reference circuit means including a second electric valve operatively connected to sense the energy level of said energy storage means and render said energy storage means operative to render said first electric valve non-conductive when the energy level of said energy storage means exceeds a predetermined value.

14. The electrical circuit arrangement recited in claim 13 wherein said second valve is a breakover device.

15. The electrical circuit arrangement recited in claim 14 wherein said breakover device is a semiconductor device.

16. The electrical circuit arrangement of claim 13 wherein said second valve is a breakover device operatively connected across said energy storage means and to said first controlled electric valve so that breakover of said device allows the energy of said energy storage means to force current through said first electric valve in the reverse direction to render said first electric valve non-conductive.

17. The electrical circuit arrangement of claim 16 wherein said breakover device is a semiconductor device.

18. The electrical circuit arrangement of claim 17 wherein said breakover device is a semiconductor device of the Shockley-type connected from one side of said energy storage means to a terminal of said first electric valve.

19. The electrical circuit arrangement of claim 13 incuding a third electric valve having a control element and said third electric valve is connected in a series circuit loop with said first electric valve and said energy storage means so that said energy storage means receives a charge from said voltage source when said first electric valve is conductive and is connected across said first electric valve when said third electric valve is conductive and wherein said second electric valve included in said energy reference circuit means is a breakover device connected so that breakover thereof when the energy of said energy storage means exceeds said predetermined value is operative to render said third electric valve conductive.

20. The electrical circuit arrangement of claim 19 wherein said breakover device connects the control element of said third electric valve to said voltage source.

21. The electrical circuit arrangement of claim 20 wherein said breakover device is a semiconductor device of the Zener-type.

22. The electrical circuit arrangement of claim 20 wherein said breakover device is a semiconductor device of the Shockley-type.

23. The electrical circuit arrangement of claim 19 wherein said breakover device is a semiconductor device connected across said energy storage means and to the control element of said third electric valve.

24. The electrical circuit arrangement of claim 23 wherein said breakover device is a semiconductor device of the Zener-type.

25. In an electrical circuit arrangement for controlling the energization of a load from a source of voltage, such circuit arrangement being of the type wherein a first electric valve having a control element is rendered conductive by electric signals applied to said control element to energize said load from said source of voltage and is rendered non-conductive by energy of an energy storage means arranged to be connected across said first electric valve to force current through said first electric valve in the reverse direction by the rendering conductive of a second electric valve having a control element, the improvement comprising: the combination with said energy storage means of an energy reference circuit means including a third electric valve connected to sense the energy level of said energy storage means and allow a signal to be applied to the control element of said second electric valve only when the energy level of said energy storage means exceeds a predetermined value, which predetermined value is always sufficient to insure that the first electric valve will be rendered non-conductive.

26. The ellectrical circuit arrangement of claim 25 wherein said third electric valve is a breakover device connected across said energy storage means and to the control element of said second electric valve so that a signal is applied to said control element to render said second electric valve conductive only upon breakover of said breakover device.

27. The electrical circuit arrangement of claim 26 wherein said breakover device is a semiconductor device.

28. An electrical circuit for use with a generator having a field winding and a D-C output circuit comprising:
 (a) First and second electric valves each having a first power terminal, a second power terminal and a control terminal;
 (b) Means for connecting the first power terminals of said first and second electric valves to one terminal of said D-C output circuit;
 (c) An energy storage means connected between the second power terminals of said first and second electric valves;
 (d) A charging element having one side connected to the second power terminal of said second valve and the other side thereof connectable to the other terminal of said D-C output circuit;
 (e) Means for connecting one side of said field winding to the second power terminal of said first electric value, the other side thereof being connected to said other terminal of said D-C output circuit;
 (f) Means for supplying signals to the control terminal of said first electric valve for rendering said first electric valve conductive;
 (g) Voltage sensing means connected across the D-C output circuit and responsive to a predetermined voltage level thereof to block the supply of signals to the control terminal of said first valve when the voltage of said D-C output circuit reaches said predetermined level; and
 (h) Energy reference circuit means including a breakover device connected between the said one terminal of said D-C output circuit and the control terminal of said second valve, said breakover device being operative to sense the energy level of said energy storage means and render said second valve conductive when the energy level of said energy storage means exceeds a predetermined level.

29. The electrical circuit recited in claim 28 wherein said energy storage means is a capacitor and said charging element is a resistance.

30. The electrical circuit recited in claim 28 wherein said breakover device is a semiconductor device of the Zener-type.

31. The electrical circuit recited in claim 28 wherein said breakover device is a semiconductor device of the Shockley-type.

32. The electrical circuit recited in claim 28 wherein said first and second valves are controlled rectifiers, said energy storage means is a capacitor, said charging element is a resistance and said breakover device is a semiconductor device.

33. The electrical output of claim 32 including a deburst circuit comprising a resistance-capacitance network connecting the second terminal of said first controlled rectifier to the said other terminal of said D-C output circuit, said resistance-capacitance network being connected to said D-C output circuit so that said first controlled rectifier is delayed from conducting at the end of each commutation thereof and wherein said delay time reduces to zero as the average voltage of said generator field winding approaches the voltage of the D-C output circuit.

References Cited

UNITED STATES PATENTS

| | | | |
|---|---|---|---|
| 3,198,989 | 8/1965 | Mahoney | 317—33 |
| 3,206,612 | 9/1965 | Swanekump et al. | 322—28 |
| 3,226,626 | 12/1965 | Moore | 322—28 |
| 3,209,234 | 9/1965 | Bridgeman et al. | 322—28 |
| 3,209,236 | 9/1965 | Bridgeman | 322—28 |
| 3,281,638 | 10/1966 | Crawford | 317—33 |
| 3,303,388 | 2/1967 | Means | 317—33 |

MILTON O. HIRSHFIELD, *Primary Examiner.*

R. V. LUPO, *Assistant Examiner.*